US012572490B2

(12) United States Patent
Bashan et al.

(10) Patent No.: US 12,572,490 B2
(45) Date of Patent: Mar. 10, 2026

(54) LINKS FOR PLANARIZED DEVICES

(71) Applicant: MELLANOX TECHNOLOGIES, LTD., Yokneam (IL)

(72) Inventors: Ortal Bashan, Tel-Aviv (IL); Ayal Josef Lior, Kiryat-Ono (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 30 days.

(21) Appl. No.: 18/209,349

(22) Filed: Jun. 13, 2023

(65) Prior Publication Data

US 2024/0419619 A1     Dec. 19, 2024

(51) Int. Cl.
*G06F 13/40* (2006.01)

(52) U.S. Cl.
CPC ...... *G06F 13/4022* (2013.01); *G06F 13/4063* (2013.01)

(58) Field of Classification Search
CPC .......................... G06F 13/4022; G06F 13/4063
See application file for complete search history.

(56) References Cited

U.S. PATENT DOCUMENTS

| | | | | |
|---|---|---|---|---|
| 7,010,607 B1 * | 3/2006 | Bunton | ...................... | H04L 1/18 709/228 |
| 7,068,659 B1 * | 6/2006 | Hamedani | ........... | H04L 12/5601 370/395.2 |
| 8,015,253 B1 * | 9/2011 | Zapata | .................... | H04L 67/06 709/219 |

| | | | | |
|---|---|---|---|---|
| 9,608,865 B2 * | 3/2017 | McLoughlin | ......... | H04L 41/083 |
| 9,723,069 B1 * | 8/2017 | Fallows | .............. | H04L 67/1036 |
| 10,348,511 B1 * | 7/2019 | Bagg | .................... | G06F 1/3278 |
| 12,068,948 B2 * | 8/2024 | Langer | ................. | H04L 45/306 |
| 2002/0039354 A1 * | 4/2002 | Chen | ................. | H04L 12/40136 370/465 |
| 2002/0041571 A1 * | 4/2002 | Huff | ...................... | H04L 49/351 370/465 |
| 2006/0087989 A1 * | 4/2006 | Gai | .......................... | H04L 47/10 370/299 |
| 2008/0155046 A1 * | 6/2008 | Swain | ................... | H04L 12/417 709/208 |
| 2011/0099374 A1 * | 4/2011 | Berrange | ................ | H04L 63/08 713/168 |
| 2011/0110253 A1 * | 5/2011 | Ahn | ........................ | H04L 47/10 370/252 |
| 2012/0059957 A1 * | 3/2012 | Millsaps | ................ | H04L 49/35 710/316 |

(Continued)

FOREIGN PATENT DOCUMENTS

WO     WO 2017/024910     2/2017

OTHER PUBLICATIONS

Extended Search Report for European Patent Application No. 24181045.6, dated Nov. 18, 2024, 9 pages.

*Primary Examiner* — Faisal M Zaman
(74) *Attorney, Agent, or Firm* — Sheridan Ross P.C.

(57)     ABSTRACT

A network device, system-on-a-chip, and method of performing an auto-negotiation for a planarized computing system. In response to a link request, switching hardware determines whether a source of the link request is planarized or non-planarized. If a mismatch between a received link request and a sent link request occurs, a lower-level event is escalated to the operating system which is enabled to respond to continue the auto-negotiation process.

20 Claims, 5 Drawing Sheets

(56)  References Cited

U.S. PATENT DOCUMENTS

| | | | | |
|---|---|---|---|---|
| 2014/0003283 | A1* | 1/2014 | Koenen | H04L 41/08 |
| | | | | 370/254 |
| 2014/0378096 | A1* | 12/2014 | Mukherjee | H04M 3/436 |
| | | | | 455/410 |
| 2015/0103708 | A1* | 4/2015 | Kang | H04W 4/80 |
| | | | | 370/329 |
| 2015/0256840 | A1* | 9/2015 | Sato | H04N 19/46 |
| | | | | 375/240.03 |
| 2016/0191311 | A1 | 6/2016 | Wang | |
| 2016/0366071 | A1* | 12/2016 | Chandran | H04L 49/3054 |
| 2017/0033948 | A1* | 2/2017 | Yamaguchi | H04L 65/1016 |
| 2017/0135014 | A1* | 5/2017 | Li | H04W 76/15 |
| 2018/0329855 | A1* | 11/2018 | Das Sharma | H04L 69/24 |
| 2018/0331864 | A1* | 11/2018 | Das Sharma | H04L 25/03 |
| 2019/0173960 | A1* | 6/2019 | Zhao | H04L 69/18 |
| 2020/0106664 | A1 | 4/2020 | Kapur et al. | |
| 2020/0192853 | A1* | 6/2020 | Caruk | G06F 13/1689 |
| 2020/0226084 | A1* | 7/2020 | Das Sharma | G06F 13/362 |
| 2020/0371579 | A1* | 11/2020 | Selvam | G06F 1/3278 |
| 2021/0365399 | A1* | 11/2021 | Dai | G06F 13/4221 |
| 2021/0397368 | A1* | 12/2021 | Nam | G06F 13/385 |
| 2022/0116138 | A1* | 4/2022 | Das Sharma | G06F 13/4027 |
| 2023/0199551 | A1* | 6/2023 | Kim | H04W 28/082 |
| | | | | 370/229 |
| 2024/0264965 | A1* | 8/2024 | Srivastava | G06F 13/4018 |

* cited by examiner

LINKS FOR PLANARIZED DEVICES

FIELD OF THE DISCLOSURE

The present disclosure is generally directed to communication systems and more particularly to systems for providing auto link negotiation for planarized devices.

BACKGROUND

Conventional systems for auto-negotiating links are inadequate for providing auto-negotiation in many circumstances. For example, using conventional auto-negotiation techniques, when a user connects a device such as a switch, network interface controller (NIC), or other computing system to another switch, NIC, or computing system with a cable, if one side is capable of planarized communication and the other side is not, then a link may either fail to be automatically established or may be automatically established with improper port configuration(s).

SUMMARY

In an embodiment disclosed herein, a device, such as a switch, a NIC, or other computer system capable of receiving and transmitting data, is enabled to receive a link request, determine, based on the link request, whether a source of the link request supports planarization or does not support planarization, and in response to determining whether the source of the link request supports or does not support planarization, establish a link with the source of the link request and configure one or more settings associated with a port such as a width (e.g., number of lanes), a communication speed, and/or a planarization type. As used herein, connection settings may include, for example, a communication speed and a packet size for data shared between the devices.

Systems and methods as described herein offer a number of advantages over conventional approaches. Conventional systems and methods of link negotiation involve each side of a connection generating and sending a link request to the other side. Based on data in the link request, each device may be enabled to determine a common denominator of width and speed between the devices.

When a user connects one or more devices to a switch which is capable of providing planarized communication, in addition to selecting a width and speed, configuration settings of the switch can be set to reflect whether each device connecting to the switch is enabled with planarization technology (e.g., configured to support planarization). However, conventional link requests do not indicate whether a device is capable of planarization. As a result, planarization introduces new challenges not solved by conventional auto-detection schemes.

For ease-of-use and to reduce or eliminate errors which arise from requiring users to manually adjust configuration settings, when a cable, such as a cable including four lanes (referred to herein as a 4× cable), is connected to a switch, an automatic port configuration can be performed without requiring user configuration of port settings. In non-planarized systems, connecting a 4× cable to a non-planarized switch should result in a non-split port with 4 lanes. As used herein, XDR indicates a speed of 200 Gbps per lane and NDR indicates a speed of 100 Gbps per lane. In planarized systems, connecting a 4× cable to a planarized switch may be configured to result in either a non-split port with 4 lanes (i.e., a 4×NDR connection, in which a four-lane port is initialized with each lane of the four lanes operating at 100 Gbps) or four separate planarized virtual ports, with each of the four lanes treated as a separate virtual port (i.e., four 1×XDR connections, in which four one-lane ports are initialized with each of the four ports operating at 200 Gbps).

Another use case of the embodiments described herein enables a planarized switch, when connected to one or more devices by a 2× cable plugged into a port of the switch to automatically configure the port with one of three options: (1) non-planarized 2× connectivity in NDR to non-planarized switch or HCA; (2) a planarized aggregated port having 2×XDR; or (3) a non-planarized 2× connectivity in XDR speed, depending on capabilities of the connecting one or more devices.

As described herein, a switch may be enabled to automatically detect a type of connectivity requested by a link partner in a planarized system during the link negotiation phase and before the link is established based on the information provided from the link partner in a link request. The systems and methods described herein offer improvements as compared to conventional systems which require user intervention to avoid link failure or improper port settings.

Using a system or method as described herein, a switch may be capable of detecting the capabilities of a connected device, including whether the connected device is capable of planarization and, in response, establishing a link with the connected device and setting configuration settings of a port of the switch to the most optimal settings for efficient data transfer between the switch and the connected device.

Unlike bundling protocols such as link aggregation control protocol (LACP) as defined in IEEE 802.3ad, which operate after link establishment and cannot create new ports based on some logic or exchanged information, systems and methods described herein operate before link establishment. As a result, based on logic and/or exchanged information from a connected device, a switch may be enabled to create one or more new virtual ports prior to establishment of a link with the device. Using systems and methods as described herein, a switch may be enabled to receive a link request, determine an optimal setting based on requested link capabilities in the link request, and automatically create one or more ports.

A switch programmed as described herein to implement an automatic link configuration provides an enhancement of the conventional auto-link negotiation methods, resulting in information being exchanged and logic defined to deduce the link partner based on a match or a difference between offered capabilities and requested capabilities.

Systems and methods described herein enable switches to automatically set configuration settings to an optimal speed, width, and planarization, when establishing a link with any number of switches, NICs, and other devices already installed in the field, whether or not each device supports planarization.

Additional features and advantages are described herein and will be apparent from the following description and the figures.

BRIEF DESCRIPTION OF THE DRAWINGS

The present disclosure is described in conjunction with the appended figures, which are not necessarily drawn to scale.

DETAILED DESCRIPTION

Figure 1:
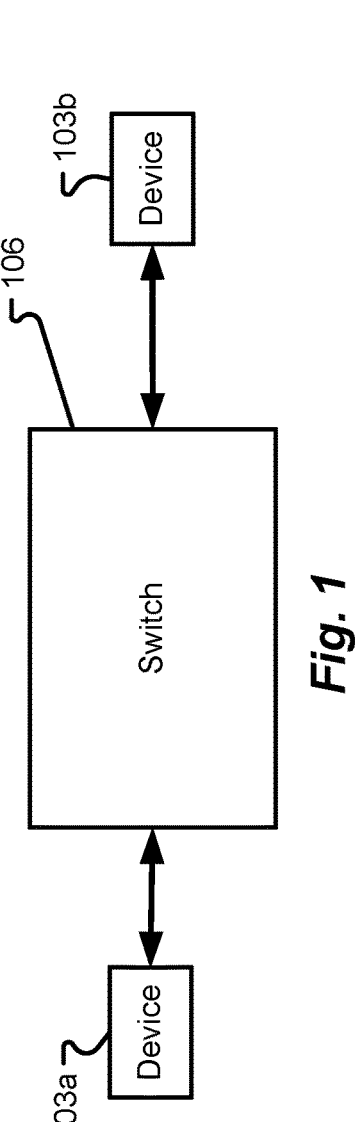
FIG. 1 is an illustration of a computing environment in accordance with one or more embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably, and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Datacenters are the storage and data processing hubs of networks such as the Internet and private cloud-based networks. The deployment of cloud applications is causing datacenters to expand exponentially in size, stimulating the development of faster switches than can cope with the increasing data traffic inside the datacenter. Faster switches include switches capable of planarized communication over ports when connected with other switches, NICs, or other devices. While planarization enables improved communication between switches and devices, the ability for a user such as a network operator to simply connect switches and devices with cables and rely on conventional auto-negotiation methods results in mis-configured ports. Using a system or method as described herein, such a user is enabled to rely on systems and methods for auto-negotiation which account for planarization. And, in the case of additional information being required, the user will be notified and offered an opportunity to adjust settings as needed. As a result, the user can set up switches and devices in a network with greater efficiency as compared to conventional auto-negotiation systems.

Referring now to FIGS. 1-6, various systems and methods for auto-negotiating data links will be described. While various embodiments will be described in connection with utilizing a switch and similar systems, it should be appreciated that embodiments of the present disclosure are not limited to the use of a switch but may be expanded to any computing system capable of connecting with other computing systems.

As described herein, a switch may refer to a standalone network switch, a collection of switches, a NIC, a collection of NICs, a computing system, or any other device equipped with one or more ports and capable of sending and receiving data. A switch suitable for implementing the systems and methods described herein may also be capable of facilitating planarized communication.

A switch as described herein may communicate with one or more devices such as other switches or other type of computing system, via cables connected to ports of the switch. A single switch may comprise any number of ports (e.g., 1-N ports, where N is an integer value greater than one). Each port may comprise any suitable number of data lanes for parallel data transmission. For example, the systems and methods described herein may be performed using single-lane or multi-lane ports. Such ports may conform to various networking standards, such as InfiniBand or Ethernet, among others.

In some instances, a port of a switch may incorporate multiple lanes to facilitate higher data throughput. As an illustration, a switch may comprise one or more two-lane ports or four-lane ports. A cable configured in a two-to-one fashion may be used to connect such a port to two separate devices or to two ports on one device. Such a cable may comprise a single connector at one end connected to a multi-lane port on the switch while the opposite end of the cable may split into two connectors, each of which may be connected to a port on different devices or the same device. Such an arrangement enables the switch to communicate concurrently with multiple ports and/or devices via a single port of the switch, thereby optimizing network performance and efficiency.

As described herein, switches and devices may be interconnected by cables. A cable as described herein may be an electrical and/or optical, or a cable of any other medium capable of supporting communication between computing systems.

A cable may comprise any type of physical connector and any number of connector interfaces/ends. For example, a two-to-one cable configuration, featuring a single connector on one end and dual connectors on the other end may be used. Each connector may be designed to support any number of lanes from a port, thus enabling connections to single or multiple ports on different devices. For example, a four-lane connector on a first side of a cable may connect to a four-lane port of a switch and two two-lane connectors on the other side of the cable may connect to different two-lane ports on the same or different devices. Using such a cable, two lanes of the four-lane port of the switch may be in communication with one port of a device and the other two lanes of the four-lane port of the switch may be in communication with another port of the device or of a different device.

As described herein, devices such as switches in a network may be capable of providing planarization. Planarization enables devices to communicate via multiple virtual lanes over a single physical lane. As a result, a multi-lane cable may be used to link a single port of a switch to multiple devices and each device, if capable of planarized communication, may be enabled to establish a parallelized communication over a single lane of the cable.

The possibility of each lane of a cable being either a planarized or a non-planarized connection creates an issue when using conventional auto-negotiation systems. When a device is connected to a switch via a cable, the switch needs to be able to automatically configure itself based on the capabilities of the connected device without requiring a user to manually adjust configuration settings.

Conventional systems and methods of link negotiation involve each side of a connection making a link request. Based on the data in the link request, each device may be enabled to determine a common denominator of width and speed between the devices.

When a cable connects one or more devices to a switch which is capable of providing planarized communication, configuration settings of the switch must be set to reflect whether each device connecting to the switch is enabled with planarization technology. However, conventional link requests do not indicate whether a device is capable of planarization. As a result, planarization introduces new challenges not solved by conventional auto-detection schemes. Also, when mismatches between offered and received port settings occur, the operating system (OS) of each device is notified only as to whether the link was established or whether the link failed. As a result, using conventional systems, the operating system (OS) is not enabled to compute resolutions for failed links.

As described above, for ease-of-use and to reduce or eliminate errors which arise from requiring users to manually adjust configuration settings, when a cable, such as a cable including four lanes (referred to herein as a 4× cable), is connected to a switch, an automatic port configuration should be performed without requiring user configuration of port settings. In planarized systems, connecting a 4× cable to a planarized switch may be configured to result in either a non-split port with 4 lanes (i.e., a 4×NDR connection) or four separate planarized virtual ports, with each of the four lanes treated as a separate virtual port (i.e., four 1×XDR connections).

When connecting a planarized switch to one or more devices by a 2× cable plugged into a port of the switch, the systems and methods described herein enable the switch to automatically configure the port with one of three options: (1) non-planarized 2× connectivity in NDR to non-planarized switch or HCA; (2) a planarized aggregated port having 2×XDR; or (3) a non-planarized 2× connectivity in XDR speed, depending on capabilities of the connecting one or more devices.

As described herein, a switch may be enabled to automatically detect a type of connectivity requested by a link partner in a planarized system during the link negotiation phase and before the link is established based on the information provided from the link partner in a link request. Using a system or method as described herein, a switch may be capable of detecting the capabilities of a connected device, including whether the connected device is capable of planarization and, in response, establishing a link with the connected device and setting configuration settings of a port of the switch to the most optimal settings for efficient data transfer between the switch and the connected device.

A switch programmed as described herein to implement an automatic link configuration provides an enhancement of the conventional auto-link negotiation methods, resulting in information being exchanged and logic defined to deduce the link partner based on a match or a difference between offered capabilities and requested capabilities.

As illustrated in FIG. 1, two or more devices 103a, 103b, may be in communication via a switch 106. While embodiments of the disclosed systems and methods are described as facilitating the linking of devices 103 and switches 106, it should be appreciated the same or similar systems and methods may be implemented using any type of computing system instead of any particular devices 103 or switches 106 as described herein. Any device 103 and/or switch 106 capable of transmitting and/or receiving data, such as TCP, UDP, or other data protocols may be used to perform the described methods.

The devices 103 and switch 106 may, for example, form a local area network (LAN) connecting nodes within an area, such as a home, office, or building. Such nodes may be other devices 103 and/or switches 106. A LAN may use Ethernet, InfiniBand, Wi-Fi, or other technologies to provide communication between nodes. TCP communication over a LAN may be used, for example, to provide data transfer within the local network, facilitating applications such as file sharing, network printing, and media streaming.

In some implementations, a network as described herein may comprise the Internet, one or more mobile networks, such as 4G, 5G, LTE, virtual networks, such as a VPN, or some combination thereof. For example, devices 104 and switches 106 as described herein may be a part of a wide area network (WAN) and may be used to connect nodes over geographic distances. Such nodes may be additional devices 103 and/or switches 106. A WAN may comprise, for example, one or more of lines, satellite links, cellular networks. A WAN may use various transmission technologies, such as leased lines, satellite links, or cellular networks, to provide long-distance communication. TCP communication over a WAN may be used, for example, to enable nodes to communicate reliably across vast distances, facilitating applications such as remote access, virtual private networks (VPNs), and global file transfer.

Each of the devices 103*a*, 103*b* and switches 106 as described herein may comprise network interfaces including, for example, receivers, transmitters, and/or transceivers. Each device 103 and switch 106 may be capable of receiving and transmitting packets in conformance with applicable protocols such as TCP, although other protocols may be used. Each device 103 can receive and transmit packets to and from the switch 106.

As an example, a first device 103*a* may be a server and a second device 103*b* may be a client. The first device 103*a* comprising a server may host resources or services, while the second device 103*b* comprising a client may request and receive the resources or services. Examples of client-server communication include web browsing, where a web server hosts web pages and a web browser acts as the client, or file transfer, where a file server hosts files and a client accesses or uploads files.

In some implementations, devices 103*a*, 103*b* may act as clients and/or servers in a peer-to-peer (P2P) communication, where devices 103*a*, 103*b* share resources and services with each other via the switch 106. In a P2P communication, the devices 103*a*, 103*b* may communicate via the switch 106 via TCP to exchange data, such as files, media content, or processing power.

In some implementations, one or more devices 103*a*, 103*b* may be switches, NICs, proxies, gateways, load balancers, etc. Such devices 103*a*, 103*b* may serve as intermediaries between clients and/or servers, relaying or modifying the communication between the clients and/or servers using the switch 106.

In some implementations, one or more devices 103*a*, 103*b* may be Internet-of-things (IoT) devices, such as sensors, actuators, and/or embedded systems, connected to the switch 106. Such IoT devices may act as clients, servers, or both, depending on implementations and the specific IoT applications. For example, a first device 103*a* may be a smart thermostat acting as a client, sending temperature readings over the switch 106 to a second device 103*b* which may be a central server for analysis, and also or alternatively acting as a server, receiving control commands from another node which may be, for example, a smartphone executing an app.

Figure 2:
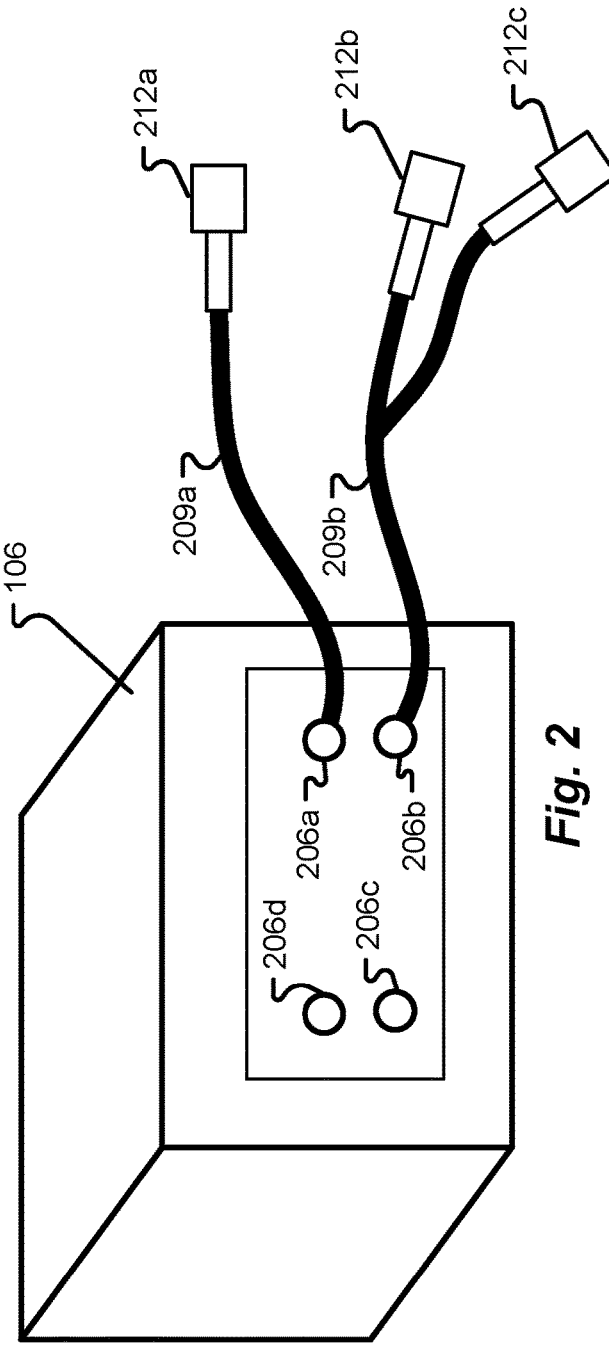
FIG. 2 is an illustration of a switch in accordance with one or more embodiments of the present disclosure.

FIG. 2 illustrates a switch 106 comprising a plurality of ports 206*a-d*. While four ports 206 are illustrated, it should be appreciated a switch 106 may comprise any number of ports 206, including only a single port. In the example illustrated in FIG. 2, two ports 206 of the switch 106 are connected with cables 209. With one end of a cable 209 connected to a port 206 of the switch 106, a second end 212 of the cable 209 may be connected to another switch 106 or to a device 103. Each port 206 may be capable of receiving and transmitting data from one or more processing devices, such as application-specific integrated circuits (ASICs), within the switch 106 onto a cable 209. Each port may be capable of connecting to multiple external devices and/or multiple ports on one or more devices 103. For example, as illustrated in FIG. 2, a cable 209*b* connected to a port 206*b* of the switch 106 is a two-to-one cable 209*b* enabling two connectors 212*b*, 212*c* to connect to the port 206*b* of the switch 106. As should be appreciated any type of one-to-one or one-to-many cable may be used in accordance with the embodiments described herein.

Each cable 209 may comprise one or more lanes, such as copper wires, optical fibers, or any medium capable of enabling communication between the switch 106 and a device 103. Each lane of a cable 209 may be capable of receiving and carrying a signal, such as an optical or electrical signal, to and from the port 206 of the switch 106.

A switch 106 as described herein may be capable of performing as one or more of a switch, a server, or other computing device. For example, the switch 106 may be a network connected device including a plurality of processing devices such as ASICs. The switch 106 may be capable of sending and receiving data optically to and/or from other switches 106 and/or devices 103 via cable connections.

It should be appreciated the systems and methods described herein may be used with any form of port or interface capable of receiving and transmitting data. The present disclosure is intended to cover any type of high-speed pluggable interface and may assume any suitable type of known or yet-to-be developed form factor, such as which may be capable of hosting an optical connector. The switches and methods described herein may be used in relation to any form of signals sent using any type of protocol relating to, for example, wavelength division multiplexing (WDM), coarse wavelength division multiplexing (CWDM), dense wavelength division multiplexing (DWDM), 400GBASE-FR4, 400GBASE-DR4, 400GBASE-SR4.2, etc., or any combination thereof.

A switch 106 as described herein may also be capable of providing planarized communication. As used herein, lane may refer to a physical channel used to transmit data. A lane may be an optical fiber or a wire in a cable.

Planarization as described herein is a concept in which multiple ports are logically grouped together to provide a higher-bandwidth communication channel as compared to non-planarized communication technology. Each of the ports which are logically grouped together may be physical or virtual ports and each may be any number of one or more lanes. The logical grouping may occur within the boundaries of a single ASIC or plurality of ASICs within a given network device.

Figure 3:
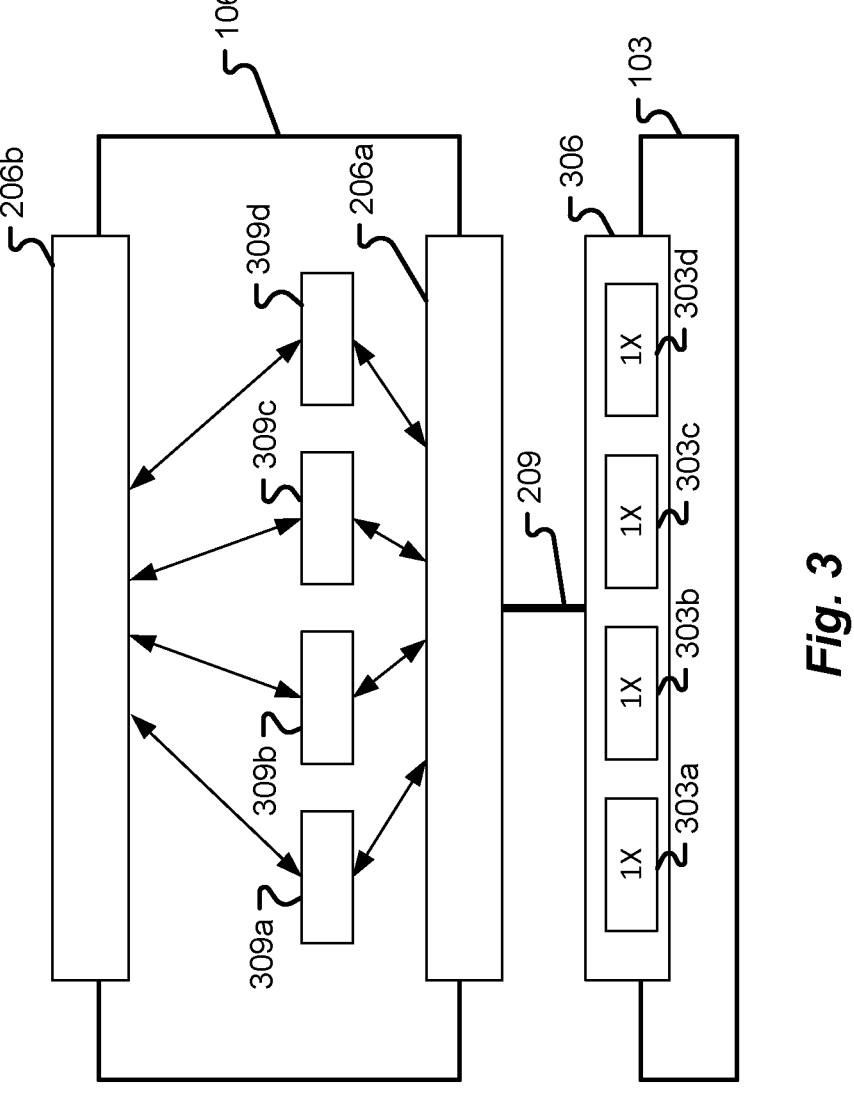
FIG. 3 is a block diagram of a switch connected to a device in accordance with one or more embodiments of the present disclosure.

As illustrated in FIG. 3, a first port 206*a* of a switch 106 may be connected to a port 306 of a device 103 via a cable 209. The port 306 of the device 103 may be a four-lane port. The cable 209 may carry data from four lanes 303*a-d* from the device 103. Upon reaching the first port 206*a* of the switch 106, each of the four lanes 303*a-d* may be treated as a separate virtual single-lane port. Through planarization, each lane can be treated as a separate logical or virtual port.

For example, a NIC of the device 103 may output each of the four lanes 303*a-d* onto the cable 209 via the port 306. Each of the port 306 of the device 103 and the ports 206*a-b* of the switch 106 may be optical small form-factor pluggable (OSFP) ports capable of providing data at 400 Gbps or quad small form-factor pluggable (QSFP) ports capable of providing data at 100 Gbps for example. It should be appreciated that in some embodiments other pluggable form factors may be used.

As a result of planarization, each lane 303*a-d* may be treated by the switch 106 as a separate virtual port. As a result, each lane 303*a-d* may be handled by a different processing device 309*a-d* of the switch 106. Each processing device 309*a-d* may be, for example, an ASIC or another processing system or circuit capable of handling data. Using planarization, each processing device 309*a-d* handles a different lane. In this way, the four lanes are each treated as a separate virtual port. After handling the data received via the first port 206*a*, each processing device 309*a-d* may provide an output to one or more ports, such as a second port 206*a* as illustrated in FIG. 3.

Figure 4:
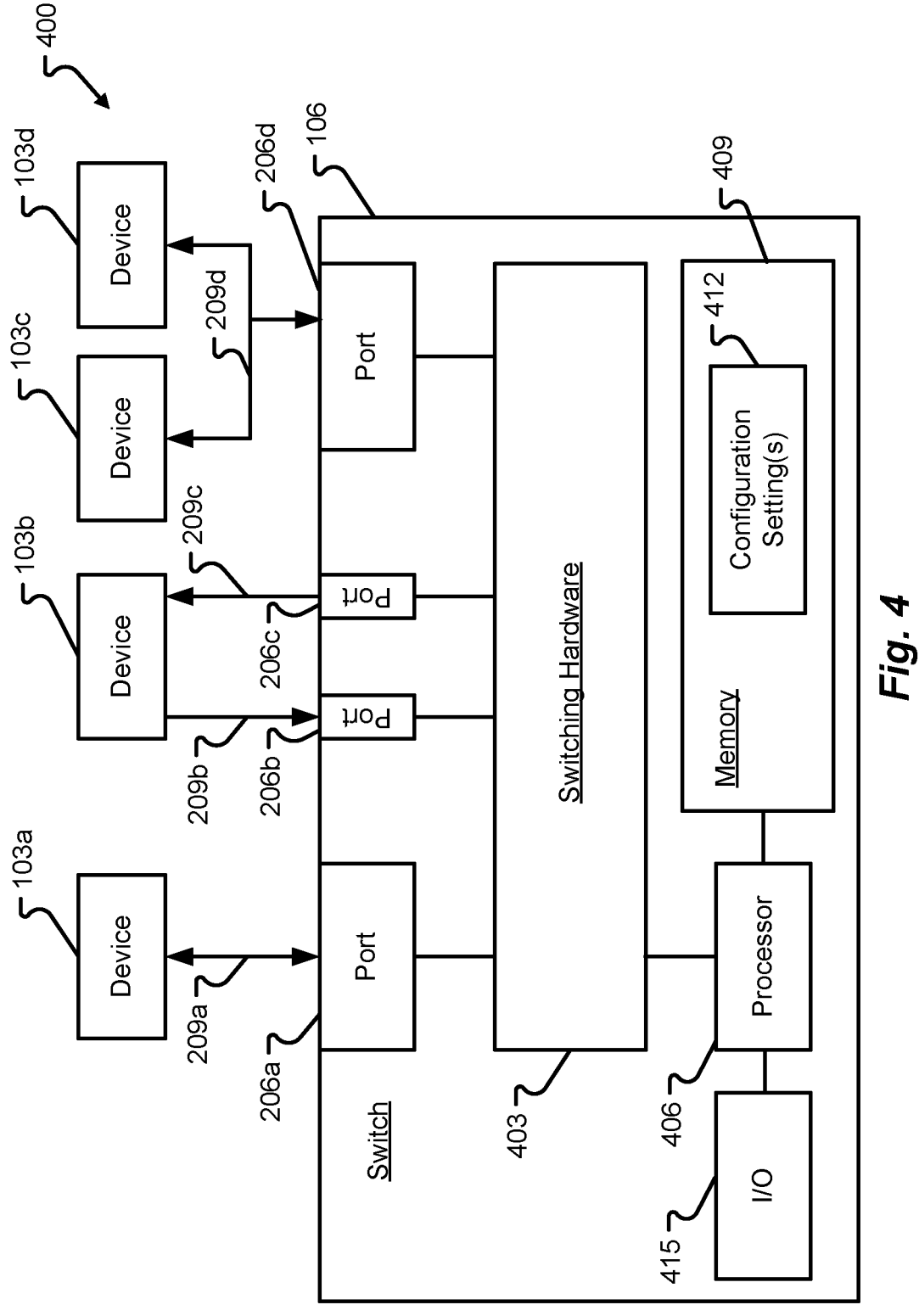
FIG. 4 is a block diagram of a switch connected to devices in accordance with one or more embodiments of the present disclosure.

Referring to FIG. 4, a configuration of a communication system 400 including a switch 106 connected with a device 103 will be described in accordance with at least some embodiments of the present disclosure. It should be appreciated that the components described with reference to FIG. 4 may or may not also be used in each of the embodiments described herein. For example, in some embodiments, a greater or lesser number of devices 103, ports 206, and/or cables 209 may be used.

In the configuration of FIG. 4, a communication system 400 is shown to include a switch 106, connecting one or more devices 103a-d via a number of ports 206. The switch 106 of FIG. 4 is shown to be connected with four devices 103a-d via a plurality of ports 206a-d. The illustration of four devices 209a-d is for the purpose of discussion and should not be construed as limiting embodiments of the present disclosure. Specifically, a switch 106 may be configured to connect any suitable number of devices 103a-d and the switch 106 may include any number of ports 206a-d to facilitate such connections. A switch 106 may be configured to connect a greater or lesser number of devices 103 than illustrated in FIG. 4. Moreover, embodiments of the present disclosure contemplate that not all ports 206 of a switch 106 need to be connected with a device 103. For instance, one or more ports 206 of a switch 106 may be left unconnected (e.g., open) and may not be connected to any cable 209.

Devices 103 as described herein may be the same type of device or any of several types of devices. As a non-limiting example, some or all of the devices 103a-d may correspond to a switch, a server, a NIC, or a personal computer (PC), a laptop, a tablet, a smartphone, or the like. Devices 103a-d may be end-devices or may be nodes on a network. Devices 103a-d do not necessarily need to communicate using the same communication protocol. The switch 106 may include components to facilitate protocol conversion and/or a device 103 may be connected to the switch 106 via a pluggable network adapter.

One or more of the devices 103a-d may be considered host devices, servers, network appliances, data storage devices, or combinations thereof. It should be appreciated that a device 103 may include a network host, an Ethernet host, an InfiniBand (IB) host, etc. As another specific but non-limiting example, one or more of the devices 103 may correspond to a server offering information resources, services and/or applications to user devices, client devices, or other hosts in the environment 400. It should be appreciated that devices 103 may be assigned one or more network addresses (e.g., IP addresses) and the format of a network address assigned thereto may depend upon the nature of the network to which the device 103 is connected.

FIG. 4 illustrates that one or multiple cables 209a-d may be used to connect one or more devices 103a-d to a switch 106. In some embodiments, a single device 103a may connect to a single port 206a via one cable 209a forming a bidirectional communication link. The bidirectional communication link may be established over a networking cable and may utilize any suitable communication protocol known or yet to be developed for the transmission of data packets.

A device 103b may alternatively, or additionally, be connected with the switch 106 via multiple ports 206b, 206c. In such a configuration, one of the ports 206c may be used to carry data from the switch 106 to the device 103b whereas the other of the ports 206b may be used to carry data from the device 103b to the switch 106. In such a configuration, separate cables 209b, 209c may be used for data uplink and data downlink.

A single port 206d may also be capable of connecting to a plurality of devices 103c, 103d via a one-to-many cable 209d such as the one-to-two cable 209d illustrated in FIG. 4. Additionally, or alternatively, two or more ports of one device 103 may be connected to a single port of a switch 106 using a one-to-many cable. It should be appreciated that any arrangement of potential connections of ports 206 of a switch 106 to ports of one or more devices 103 are contemplated and possible.

The switch 106 may correspond to an optical switch and/or electrical switch. In some embodiments, the switch 106 may include switching hardware 403 configurable to selectively interconnect the plurality of ports 206a-d, thereby enabling communications between the plurality of ports 206a-d, enabling communication between the devices 103a-d. In some embodiments, switching hardware 403 of the switch 106 may be configured to selectively enable devices 103a-d connected to the switch 106 to communicate in pairs based on a particular configuration of the switching hardware 403. The switching hardware 403 may include optical and/or electrical component(s) switchable between different matching configurations. In some embodiments, such optical and/or electrical components may be limited in the number of matching configurations it can accommodate, meaning that a port 206 may not necessarily be connected with/matched with every other port 206 at a particular instance in time. The switching hardware 403 may be enabled to perform auto link negotiation as described herein, to establish links with connected devices 103, and to adjust configuration settings including width, speed, and planarization type for the ports used to establish the links with the connected devices.

In some embodiments, the switching hardware 403 of the switch 106 may comprise one or more optical and/or electrical components or circuitry configured to manage packet flows and packet transmissions. For example, the switching hardware 403 of the switch 106 may alternatively or additionally include one or more integrated circuit (IC) chips, microprocessors, circuit boards, data processing units (DPUs), passive analog circuit components (e.g., resistors, capacitors, inductors, etc.), digital circuit components (e.g., transistors, logic gates, etc.), memory devices, field programmable gate arrays (FPGAs), ASICs, any combination(s) thereof, and/or the like. As an example, the switching hardware 403 may be configured to operate by mechanically shifting or moving an optical fiber to drive one or more alternative fibers. Alternatively, or additionally, the switching hardware 403 may include components that facilitate switching between different port matchings by imparting electro-optic effects, magneto-optic effects, or the like. For instance, micromirrors, piezoelectric beam steering mechanisms, liquid crystals, filters, and the like may be provided in the switching hardware 403 to facilitate switching between different matching configurations of connected devices 103.

As described above, while a switch 106 is used as an example system for performing the systems and methods described herein, it should be appreciated that the same or similar systems and methods may be implemented using any device or system capable of communicating with devices 103a-d. For example, instead of performing as a switch, a system performing the functions described herein may be an end-device such as a personal computer or server.

As illustrated in FIG. 4, the switch 106 may also comprise a processor 406 and a memory device 409. A processor 406 of the switch 106 may be a switching processor, a central processing unit (CPU), or any processing device capable of managing network traffic, applying network policies, and interfacing with the switching hardware 403 such as by processing received link requests or information relating to received link requests in the event of a mismatch between sent and received processing capabilities. The processor 406 of the switch 106 may also be enabled to enable communication with users either via an I/O 415 of the switch or via a connected device 103.

When a packet, such as a link request as described herein, arrives at a port 206 of the switch 106, the packet may first be received by a physical interface in the switch hardware 403. The physical interface may be, for example, a dedicated hardware component such as a NIC. The packet, or data associated with the packet, may be passed on to the processor 406 of the switch 106. The processor 406 and/or the switching hardware 403 may be capable of performing actions such as inspecting a header of the packet to determine its destination address, source address, and other metadata.

The processor 406 and/or the switching hardware 403 may be capable of using information in a packet's header to determine how to handle the packet. For example, the processor 406 and/or the switching hardware 403 may look at a destination address associated with the packet and consult an address table to determine an appropriate output port. If the packet's destination address matches a device 103 connected to one of the ports 206, the processor 406 and/or the switching hardware 403 may be capable of forwarding the packet to the port 206.

The processor 406 and/or the switching hardware 403 may also be capable of generating new packets. For example, the processor 406 and/or the switching hardware 403 may be capable of communicating with devices 103 connected to the switch 106. The processor 406 may also be capable of generating user prompts and notifications and otherwise communicating with a user such as via an input/output (I/O) device 415. Examples include generating and sending link requests, user prompts, notifications requesting input from a user, etc. The processor 406 may be capable of creating such packets, populating headers of such packets with appropriate information, and sending the packets out via the appropriate port 206.

When a packet (either a forwarded packet or a newly generated packet), such as a link request, is to be transmitted by the switch 106, the processor 406 may hand the packet off to an appropriate NIC such as the switching hardware 403. The switching hardware 403 may be capable of transmitting the packet as a series of electrical, optical, or radio signals, depending on the type of physical medium connected to the port 206. As should be appreciated, while a processor 406 is described herein, in some embodiments, a dedicated hardware system, such as an ASICs may be used to perform any of the processes and functions described herein.

The memory 409 of the switch 106 may store configuration settings 412 as described in greater detail below. The processor 406 and the memory 409 may operate in unison to manage and control the network traffic flowing through the switch 106. The processor 406 may be capable of communicating with the memory 309 to store information such as address tables, OS information, and configuration settings 412. The processor 406 may use such information to make decisions about how to handle incoming packets and to manage overall operation of the switch 106.

In addition to managing network traffic, the processor 406 may also be responsible for adjusting configuration settings 412 of a port 206 of the switch 106. Adjusting configuration settings 412 of a port 206 may involve enabling or disabling one or more lanes of the port 206 and/or setting a speed, width, planarization type, etc., of one or more lanes of the port. When a configuration change is made, either by the processor 406 or by switching hardware 403 of the switch 106, the processor 406 may be capable of interpreting the change, applying the change to the relevant port 206, and updating the configuration settings 412 in the memory 409. The processor 406 may also communicate with the switching hardware 403, such as a NIC to apply hardware-specific settings, such as link speed, width, planarization type, or other link settings.

When a device 103 is connected to a port 206 of the switch 106 by a cable 209, the device 103 and the switch 106 need to negotiate certain link configuration settings to ensure proper communication. This process, which may be referred to as auto-negotiation, is used to establish a link between the switch 106 and the device 103, allowing for data transfer between the switch 106 and the device 103. Auto-negotiation as described herein involves negotiating parameters such as link speed (e.g., 10 Mbps, 100 Mbps, 1 Gbps, etc.), link width (e.g., one lane, two lanes, four lanes, etc.), and whether the link should be planarized. Once the connected device 103 and the switch 106 exchange capabilities via link requests as described herein, the highest performance common setting can be determined and agreed upon for the link. For example, the highest speed and greatest width acceptable to both the switch 106 and the device 103 may be selected. For planarization, if both the switch 106 and the device 103 are capable of planarization, the link may be automatically established as a planarized link. If one of the switch 106 and the device 103 is not capable of planarized communication, additional logic or processing may be required as described below.

After the negotiation phase, the processor 406 of the switch 106 may establish a link with the device 103 and/or adjust configuration settings 412 associated with the port 206 based on the results of the negotiation. Adjusting the configuration settings 412 may involve setting a speed, width, and planarization type for the port and/or for one or more lanes of the port. Once the configuration settings 412 are successfully adjusted, the link may become operational, allowing data packets to be exchanged between the switch 106 and the connected device 103 via the port 206. This process ensures that the switch's port 206 is optimally configured to communicate with the connected device 103, promoting efficient and reliable network operation.

As described above, a switch 106 may be capable of providing planarized communication. Planarization is a concept in which a single lane of a data connection may be used to provide high-speed data transmission. Planarized data may comprise parallel data converted into serial data before being transmitted over a lane. As a result, any number of channels of data may be transmitted over a single-lane cable or a multi-lane cable. Using a system or method as described herein enables planarized devices 103 and switches 106 to complete link negotiation automatically while considering the planarization capabilities of both sides of the link.

Figure 5:
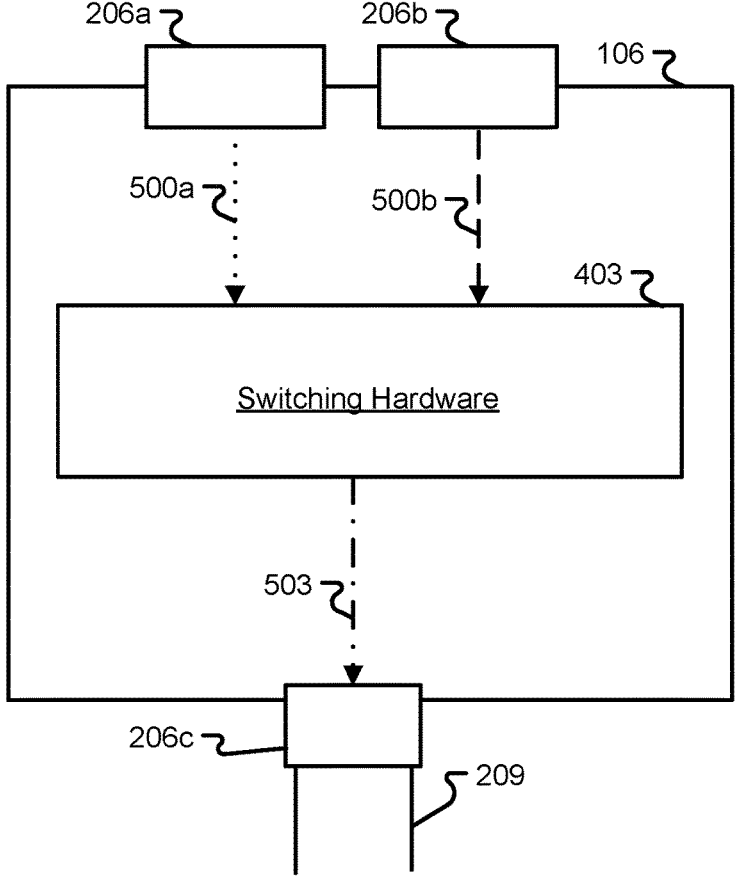
FIG. 5 is a block diagram of a switch in accordance with one or more embodiments of the present disclosure.

As illustrated in FIG. 5, a switch 106 may receive a first flow of data 500a via a first port 206a and a second flow of data 500b via a second port 206b. Using switching hardware 403 as described above, the switch 106 may planarize the first and second flows of data 500a, 500b, into a single flow 503. The single flow 503 comprising data from the first and second flows of data 500a, 500b, may be output onto a single lane of a cable 209 via a port 206c. The lane of the cable 209 may be the only lane of a single-lane cable 209 or only one lane of multiple lanes of a multi-lane cable 209. For example, a multi-lane cable 209 may enable multiple lanes of planarized communication between the switch 106 and one or more devices 103.

If a device 103 connected to the lane of the cable 209 is capable of planarization, the device 103 may be enabled to treat the lane of the cable 209 as a virtual port and to handle the data from the first flow 500*a* and the data from the second flow 500*b* as received in the single flow 503 separately. For this reason, configuring a port connected to a planarized device to be a planarized port enables the switch 106 to provide data in a highly efficient manner.

If a device 103 connected to the lane of the cable 209 is not capable of planarization, the device 103 may not be enabled to handle the data from the first flow 500*a* and the data from the second flow 500*b* as received in the single flow 503 separately and an error may occur. For this reason, configuring a port connected to a non-planarized device 103 to be a non-planarized port enables the switch 106 to provide data in a highly efficient manner.

While FIG. 5 illustrates two separate flows 500*a*, 500*b*, as being combined into a planarized flow 503, it should be appreciated that a switch 106 or device 103 may be capable of receiving and transmitting data in a planarized flow, separating a planarized flow into non-planarized flows, receiving and transmitting non-planarized flows, combining received non-planarized flows into a planarized flow, or any combination thereof.

Upon a switch 106 being connected to one or more devices 103 via a cable 209, each side of the link may generate and send a link request. As an example, a switch 106 comprising a four-lane port 206 may, when connected to a four-lane cable 209, generate, and send four link requests. As should be appreciated, any number from one to four devices 103 may be connected to a single port of a switch 106 via a four-lane port 206. Each device 103 connected to the port 206 may send a separate link request to the switch 106.

A link request generated and sent by a device 103 connected to a switch 106 via a cable 209 may be received by the switch 106 and used to determine configuration settings of the port 206 of the switch 106 for a communication between the device 103 and the switch 106 via the cable 209. A link request generated and sent by the switch 106 connected to the device 103 via the cable 209 may be received by the device 103 and used to determine configuration settings of a port of the device 103 for the communication between the device 103 and the switch 106 via the cable 209.

As described above, when a device 103 is connected to a port 206 of the switch 106 by a cable 209, the device 103 and the switch 106 need to negotiate certain link configuration settings to ensure proper communication. This process, which may be referred to as auto-negotiation, is used to establish a link between the switch 106 and the device 103, allowing for data transfer between the switch 106 and the device 103.

Each side of a link may generate and transmit a link request to the other side indicating an acceptable one or more speeds and widths for the communication over the link, as well as an indication of whether the side of the link is capable of planarization.

Conventionally, the initial communications between are controlled by auto-negotiation in the IEEE 802.3 standard. Auto-negotiation enables two devices, such as a switch and a computing system or another switch, connected via a cable to automatically communicate their respective capabilities and set up a link taking advantage of the maximum common capability of the respective devices.

IEEE standard 802.3 defines conventional auto-negotiation control frames. The auto-negotiation function resides in the physical layer in the OSI model of the IEEE 802.3 layered model. In IEEE 802.3, the only information which reaches the OS of a switch is whether the connection succeeded or failed. The OS of the switch is not enabled to receive details describing the cause of the success or failure of the connection, such as what width or speed the far end actually requested. The OS of the switch cannot intervene.

The conventional auto-negotiation system also does not enable planarized devices and/or switches to advertise their ability to broadcast data in a planarized manner. As a result, connecting two planarized devices requires user intervention to avoid the devices communicating in a non-planarized and inefficient manner.

Using a system or method as described herein, on the other hand, additional information may be included in a link request to indicate whether the switch or device which generated the link request is capable of planarization. Furthermore, as described in greater detail below, if a mismatch between a received link request and a sent link request occurs, switching hardware 403 of a switch 106 may provide the received link request to an OS of the switch 106 to request a resolution.

Auto-negotiation as described herein is implemented by sending messages or information between the switch 106 and the connected device 103. Such a message may be referred to as a link request 600 and may be as illustrated in FIG. 6.

Figure 6:
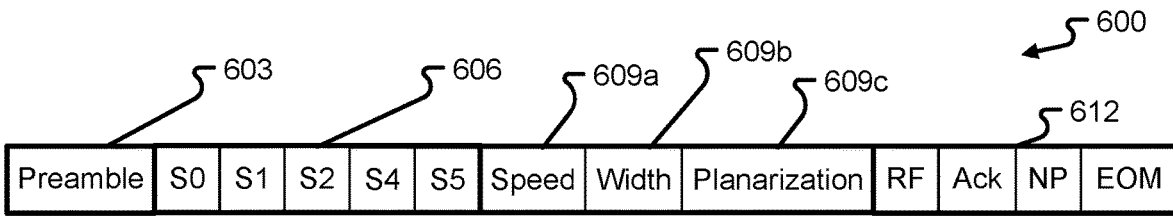
FIG. 6 is a block diagram of a link request in accordance with one or more embodiments of the present disclosure.

As described herein, a link request 600 may comprise one or more fields as illustrated in FIG. 6. A link request 600 may be, for example, a data packet or other form of data in which a device or switch may be capable of providing information to request a link. Each field of a link request may indicate information such as a width, a speed, and a planarization type.

A link request 600 may in some embodiments comprise a preamble 603, a selector code field 606, a set of data 609*a, b, c* indicating communication capabilities of the device sending the link request 600, and/or other fields 612. The preamble 603 of the link request 600 may be a set of predictable or predetermined bits enabling a receiver of the link request 600 to identify the data as being a link request 600. The selector code field 606 may be a field of bits which contain a code which indicates a type of technology, such as Ethernet (IEEE 802.3), IsoEthernet (IEEE 802.9), etc. The set of data 609*a, b, c* indicating communication capabilities may be referred to as a link code word (LCW) and may include fields or bits indicating one or more speeds, one or more widths, and whether the sending device or switch is capable of planarization.

The fields indicating the speed and width of the LCW may be in the form of masks. For example, a speed mask may be a value or set of values used to indicate the speed of a communication link. A speed mask might be used to indicate whether a link should operate at 10 Mbps, 100 Mbps, 1 Gbps, 10 Gbps, etc.

A width mask may be a value or set of values used to indicate the width of a communication channel. As described herein, a width may refer to a number of lanes to be used in a connection link, a number of bits or bytes that can be transmitted simultaneously (as in a 32-bit bus versus a 64-bit bus) in the link, or to the frequency width of a channel (as in a 20 MHz channel versus a 40 MHz channel) for the link.

A width 609*b* of a link may be a number of lanes over which the link is to be connected. In some embodiments, a link may be of any number of lanes. As described herein, a 4× link may comprise four lanes of a single port and a 2× link may comprise two lanes of a single port. A four-lane cable may be used in a variety of configurations, such as 4× on one side and two 2× connectors on the other, 4× on both sides, four 1× on both sides, etc.

In a planarized system, each lane may be considered as a logical port. A planarized switch may, upon being connected to a device via a cable connected to a port, generate a link request offering to treat each lane of the port as a different 1× planarized port. If the connected device cannot or requests not to use planarization, the switch may, in response, reconfigure the port as a 2×, 4×, or other type of non-planarized port. Such a system is in contrast to a conventional auto-negotiation system which would find a common denominator and result in a 1× non-planarized connection.

Width may indicate whether the link is to be half duplex (i.e., that data must be only sent or received at any given time, and not simultaneously) or full duplex (i.e., that data must may be sent and received simultaneously), and/or may indicate a number of lanes which may be used for the link (i.e., whether one, two, three, four, or more lanes can be used).

A speed 609a of a link may for example indicate one or more bitrates at which data is to be expected to be sent and received during the communication. Examples of speeds include 100 Mbps, 150 Mbps, etc. A link request 600 may include a range or a list of possible link speeds which are acceptable or preferred by a sending device or switch.

Speed may indicate one or more rates of data which the device sending the link request is capable of sending and/or receiving. Speeds may be in a number of megabits per second (Mbps), gigabits per second (Gbps), or may be described in technological standard terms such as 10BASE indicating 10 Mbps, 100BASE indicating 100 Mbps, etc.

An indication of planarization 609c in a link request 600 may, for example, be a one- or two-bit value, which may be referred to as a planarized type field. For example, a zero may indicate the device having generated the link request is not planarized, a one may indicate the device having generated the link request is XDR-planarized, and in some embodiments, other types of planarization may be associated with other numbers.

The planarized type field may be an optional parameter and may be assumed to be zero if not present in a link request. As a result, backwards compatibility is provided with NICs capable of NDR but which lack support for XDR.

In the case of two or more devices connecting to a switch via a single cable, the switch may receive a separate link request from each connected device and may treat each device as a separate connection. As a result, multiple lanes of a single port can each be treated as a different logical port and each logical port may perform its own auto-negotiation as described herein.

While the link request 600 of FIG. 6 illustrates the speed 609a, width 609b, and planarization 609c as separate fields of the link request 600, it should be appreciated that other arrangements may be used in certain embodiments. For example, instead of separating the speed 609a, width 609b, and planarization 609c into separate fields of the link request 600, a series of bits may be used to indicate any possible configuration of speed, width, and planarization. For example, a one appearing in a first bit of a particular field in a link request may indicate the sending device can operate at a first speed, a first width, and non-planarized, while a one appearing in a second bit of a particular field in a link request may indicate the sending device can operate at the first speed, the first width, and planarized. In some embodiments, speed and width options may be indicated using a series of bits while a single bit may be used to indicate whether the sending device can operate in a planarized mode.

A link request 600 as described herein enables backward compatibility with non-planarized devices. For example, if a link request which does not include data between the width field 609b and the other fields 612 is received by a planarized switch 106, the switch 106 can in response determine the device having sent the link request is not a planarized device and that a non-planarized communication should be established.

In some embodiments, a single bit may be used to indicate speed, width, and/or planarization type. For example, a one in a particular position of the set of data 609a, b, c may indicate the sending device is capable of supporting planarized 10BASE-T operation in full duplex mode. It should be appreciated link requests 600 may indicate speed, width, and planarization type in any number of ways.

Other fields 612 of the link request may comprise, for example, a remote fault (RF) bit indicating whether a remote fault has occurred, a next page (NP) bit indicating whether or not there are more pages to be sent following the initial page of the link request 600, a toggle bit which toggles between logic one and zero in consecutive next pages, an acknowledge (Ack) bit indicating whether or not the device sending the link request 600 is able to comply with a previously received message, and end-of-message (EOM) bit indicating whether the link request 600 is the end of a message, and/or other bits which may be used for negotiating the link.

Initial link requests 600 sent between a switch 106 and a device 103 may be used to advertise a first set of capabilities of each of the switch 106 and the device 103.

A planarized switch 106 may be capable of communicating with devices 103 in many ways. For example, a four-lane port 206 of a planarized switch 106 may be used as a single, non-planarized, four-lane (4×) link; as one, two, three, or four separate non-planarized one-lane (1×) links; two non-planarized two-lane (2×) links; one, two, three, or four separate planarized one-lane (1×) links; or any other conceivable planarized or non-planarized link.

An initial link request 600 of such a planarized switch 106 may offer a one-lane (1×) planarized link. As a result, if a planarized device 103 is connected to the switch 106, a 1× planarized link may be automatically established.

Using conventional auto-link negotiation methods, when a non-planarized device 103 is connected to such a planarized switch, the non-planarized device 103 may send a link request indicating the device 103 is capable of communicating via one, two, three, or four lanes. The link request of the planarized switch 106 indicating the switch 106 is capable of communicating via a 1× link will, using conventional auto-link negotiation methods, result in a 1× non-planarized link. However, a more capable link between the non-planarized device 103 and the planarized switch 106 would be a 4× non-planarized link. On the other hand, instead of using conventional methods, by using a system as described herein, such as using a method as illustrated in FIG. 7, the more capable link of 4× non-planarized would result in such a scenario.

As described herein, if a mismatch between the capabilities advertised by the initial link requests of the switch 106 and the device 103 is detected by the switching hardware 403, the switch 106 will be enabled to generate a new link request 600 to reflect a different set of capabilities and use the new link request 600 to communicate the different set of capabilities to the device 103. Such a process may be performed as described below in relation to FIG. 7.

Upon a connected device 103 and switch 106 exchanging capabilities via link requests, the common settings providing the highest performance in terms of speed, bandwidth, and/or other measurable factors, can be determined and agreed upon for the link. After the negotiation phase, the processor 406 of the switch 106 may establish the link and/or adjust configuration settings 412 associated with the port 206 based on the results of the negotiation. Adjusting the configuration settings 412 may involve setting the speed, width, and planarization type for the link. Once the settings 412 are successfully adjusted, the link is established and becomes operational, allowing data packets to be exchanged between the switch 106 and the newly connected device 103 via the port 206. This process ensures that the switch's port 206 is optimally configured to communicate with the connected device 103, promoting efficient and reliable network operation. In the case of multiple devices 103 being connected to the same port of the switch, the auto-link negotiation may repeat for each device 103 either simultaneously or one after another.

Figure 7:
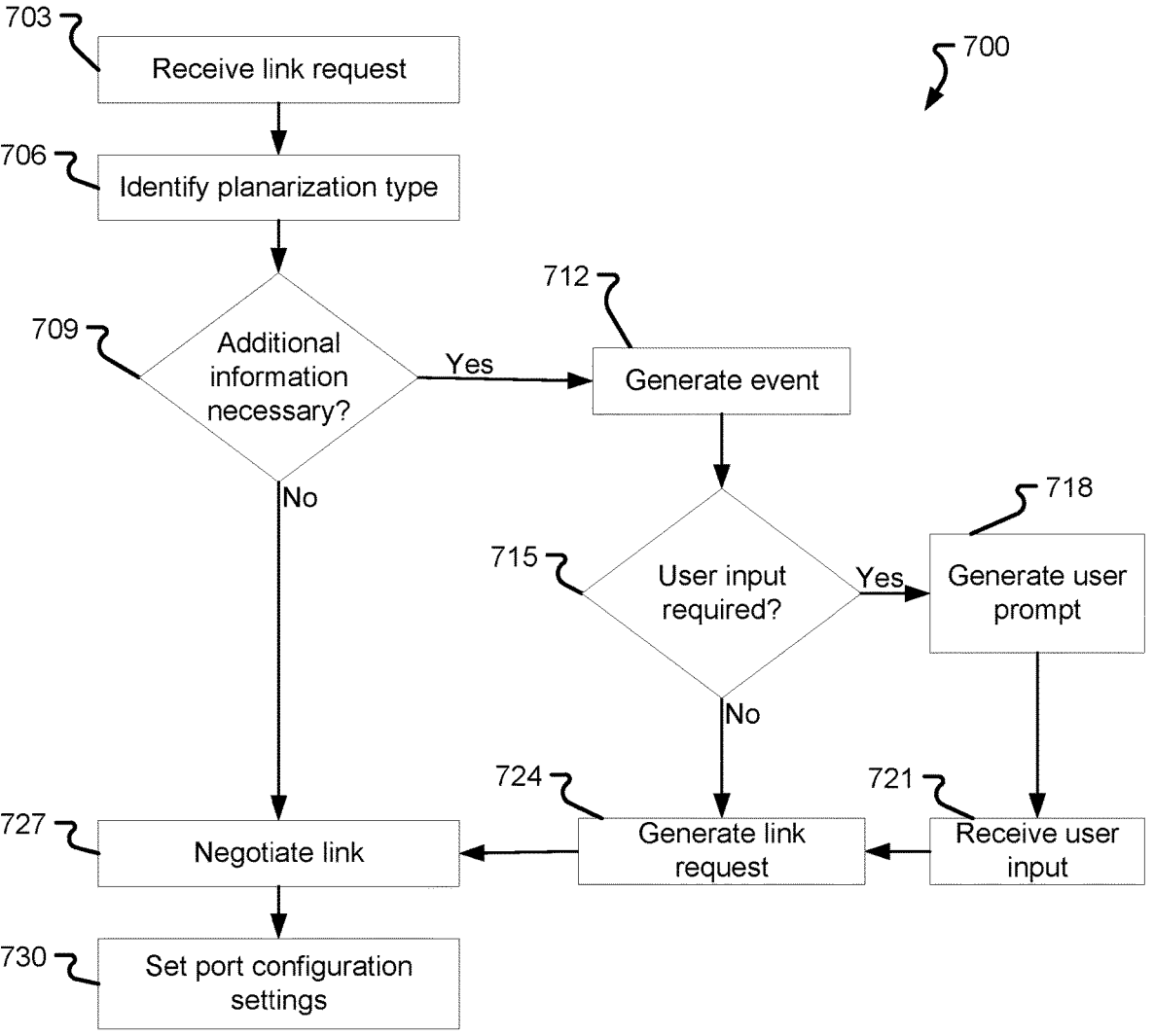
FIG. 7 is a flowchart of a method in accordance with one or more embodiments of the present disclosure.

As illustrated in FIG. 7, a method 700 may be performed using a switch 106 or other type of computing system as described herein. The method 700 may begin at 703 when one or more devices 103 are connected to the switch 106 via a port 206 and a link request 600 is received from a device 103.

As illustrated in FIG. 4, a port 206 may be connected to two separate devices 103c, 103d. The switch 106 may in such an embodiment receive two link requests 600 and may treat the lanes of the port 206d connected to each device 103c, 103d as separate virtual ports.

A link request 600 as received from a device 103 may be as illustrated in FIG. 6 and may include an indication of one or more of a speed, a width, and a planarization type which is acceptable to the sending device. The link request 600 is not a part of an existing communication. Instead, the link request is from a device for which a communication link has not yet been established.

The link request may be received by switching hardware 403 from a port 206 of the switch 106 as illustrated in FIG. 4. The switching hardware 403 may include a parser and/or other processing circuits which are capable of identifying the link request and determining contents of the link request 600. For example, the switching hardware 403 may parse the link request to identify a speed, a width, and a planarization type.

At 706, in response to receiving a link request 600, the switching hardware 403 of the switch 106 may determine whether the device 103 from which the link request 600 was received supports or does not support planarization based on a planarization type field of the link request. For example, if the planarization type field of the link request 600 is zero or empty, the switching hardware 403 may determine the device 103 is not capable of, or is requesting not to use, planarization. If the planarization type field of the link request 600 is one, the switching hardware 403 may determine the device 103 is capable of planarization.

Because a single port 206 of a switch 106 may connect to multiple ports, on the same device 103 or different devices 103, the switch 106 may, in response to a connection to a port being made, receive a plurality of link requests and, in response to each link request, determine whether the device 103 from which the link request is received supports or does not support planarization.

This step of determining whether the source of the first link request supports or does not support planarization may be performed by the switching hardware 403 in a physical layer of the switch 106. If, as described below, logic is necessary to be performed in response to a received link request, the switching hardware 403 may generate an event in the physical layer which may prompt data associated with the received link request to be sent up to a higher layer such as the OS or elsewhere.

If the received link request indicates the source of the first link request does not support planarization, the switching hardware 403 may automatically generate and send a non-planarized link request to the source device in response.

In addition to determining whether a connected device supports or does not support planarization, the switch 106 may determine a speed capability and/or a width, or a number of lanes, common to both the switch and the device.

At 709, the switching hardware 403 may also determine whether additional information is necessary to negotiate the link request. Determining whether additional information is necessary to negotiate a link request may involve determining a match cannot be found based on the received link request. For example, the switch may send its own link request to a device and receive at or near the same time a link request from the device. If a matching set of width speed and planarization can be found between the sent and received link requests, the switching hardware 403 may proceed to set up the link. If no match can be found between the sent and received link requests, these switching hardware 403 may determine additional information is necessary to negotiate the link request. If additional information is necessary to negotiate the link request, the switching hardware 403 may generate an event which may prompt the OS of the switch 106 to handle the request.

Because the OS can implement more advanced logic in determining whether to connect and what the connection details should be, a system as described herein provides benefits over conventional systems of auto-link negotiation in which no link request information is shared with the OS of the switch.

If additional information is necessary, at 712, the switching hardware 403 may generate an event. As should be appreciated, if there is not a complete match between speed, width, and planarization, the upper layer, i.e., the OS, of the switch 106 can be notified and enabled to respond accordingly, such as to tune the port to the optimal solution.

In some embodiments, generating an event may comprise, for example, the switching hardware 403 storing values in a register which can be read by the processor 406. For example, a register in the switch 106 may be used to store a link negotiation status. The link negotiation status may be, for example, a zero in the case of a mismatch, indicating that no resolution could be reached by the switching hardware 403. A register may also be used to pass information to the processor 406. For example, a register may include fields for presenting the speed, width, and planarization type of the received request. By reading the register, the processor may be capable of determining if a mismatch occurred or no resolution was reached, reading the requested link capability information from the connected device, and determining an action to perform in response.

In some embodiments, upon determining a mismatch exists, the switching hardware 403 may create an event in the lower level (i.e., the physical layer) and escalate the event to the upper layer to be handled by the OS on the systems level. To create the event, the switching hardware 403 may change an electrical state of a circuit which may be detected by a controller of the switch 106. The controller may send an electrical signal to the processor 406 such as via an interrupt line. This electrical signal may be described as an event.

The event may be escalated to an upper layer (i.e., the OS) to be handled by the processor 406. Escalating the event may comprise storing the event or other information in a memory location which the processor 406 may poll periodically.

When the processor 406 receives the interrupt signal, the CPU may invoke a software element of a kernel of the OS which may be designed to respond to such events from the switching hardware 403. Next, the OS may read the received link request and determine a response.

Upon being notified of a mismatch, the OS may read the far-end offer and compute the required action. The required action computed by the OS may comprise determining the connected device does not support planarization and, in response, offering a non-planarized link request. The required action may also involve selecting a number of lanes and/or a speed for the connection.

In order to avoid both sides of the link changing the offered link requests, in some embodiments, only a side offering a planarized connection may be enabled to make a change.

In response to the event, the OS may determine a link cannot be negotiated automatically and a user input is required to determine the proper settings for the link. At 715, the processor 406 may determine whether user input is required to negotiate the link.

If user input is required, at 718, the processor 406 may generate a user prompt. Generating a user prompt may comprise the processor 406 invoking a software application or using the operating system to create and display a notification. The notification may be a graphical user interface (GUI) including text and/or input fields. The GUI may be displayed on a display device such as an I/O 415 connected to the switch 106 or to another device 103. For example, the user prompt may be provided to a user either via an I/O 415 of the switch 106 or by transmitting to the requesting device 103 or another device 103 connected to the switch 106. Additionally, or alternatively, in some embodiments, one or more application programming interfaces (APIs), such as the representational state transfer architecture (RESTful) API may be employed to enable users to adjust settings for a link.

In some instances, a user such as a network operator may be notified and asked for instructions. For example, the switch may be capable of generating a prompt to the user, such as "It appears you are using a split cable. Do you actually want to use the split cable?" and the switch may be capable of receiving input from the user and making changes based on the user's response to configure the port appropriately.

At 721, the processor 406 may receive user input in response to the user prompt via an I/O 415 of the switch 106 or by transmitting to the requesting device 103 or another device 103 connected to the switch 106. Receiving user input may comprise receiving data from a user input device such as the I/O 415 of the switch 106. The I/O 415 of the switch 106 may comprise, for example, one or more of a keyboard, mouse, touchscreen, button, microphone, camera, or other system for interacting with a computer system.

Based on the received link request and/or any user input, the processor 406 may determine appropriate configuration setting for the link associated with the link request. At 724, the processor 406 may generate a new link request, or may instruct the switching hardware 403 to generate a new link request.

As an example of the decision-making which may be automatically performed by a processor 406 of a planarized switch 106 in response to a non-planarized device being connected to a four-lane (4×) port of the switch 106 being connected to a device 103 via a cable 209, the switching hardware 403 may initially generate a first link request indicating the switch 106 is capable of a speed of either 100 Gbps or 200 Gbps, a width of 4×, and either planarized or non-planarized communication. The switching hardware 403 may receive a link request from the device 103 indicating the device 103 is capable only of a speed of 100 Gbps, a width of 4×, and non-planarized communication.

With a conventional auto-negotiation system, the resulting connection would be of a speed of 100 Gbps, a width of 4×, and the link would be non-planarized. On the other hand, using a method as described herein, the switching hardware 403 may notify the OS of the request of the device 106 and the OS can decide whether to begin a planarized communication, a non-planarized communication, or to let the request fail. The response to this example may be to initialize a new non-planarized 4× port at 100 Gbps speed.

As another example, consider a device 103, such as a NIC, connected to a switch 106 requesting a 1× planarized connection. In response, the switching hardware 403 may automatically accept the link request and initialize the port to be 1× and planarized.

As another example, consider one device 103, such as a NIC, connected to a single port of a switch 106 via a two-to-one cable 209, with two connectors connected to the same or different ports of the device 103. In response, the OS of the switch 106 may be enabled to notify a user and ask the user whether the split two-to-one cable 209 is intentional or whether the cable 209 should be treated as a single one-to-one cable instead.

As another example, consider a device 103, such as a NIC, connected to a switch 106 requesting a 2× non-planarized connection, while the switching hardware 403 sends a link request requesting a 1× planarized connection. In response, due to the mismatch, the OS may determine a 2× non-planarized link should be established.

As another example, consider a device 103, such as a NIC, connected to a switch 106 requesting a 1×, 2×, or 4× non-planarized link while the switch requests a 1× planarized connection. As a result of the mismatch, the switch OS may determine that, because the connected device is non-planarized, a 4× non-planarized connection should be established. Next, the switching hardware 403 may continue the auto-negotiation process by removing some of the ports and creating a single, wider port, such as a 4× non-planarized connection. This is in contrast to conventional systems which would negotiate the original link requests down to a 1× non-planarized link.

At 727, the switch 106 may negotiate the link using the new link request. Negotiating the link using the new link request may comprise the switching hardware 403 receiving a link request from the processor 406 or generating the new link require based on data received from the processor 406. For example, the processor 406 may instruct the switching hardware 403 to send a new link request indicating a particular width, speed, and planarization type. The switching hardware 403 may send the new link request to the device and, upon receiving a response, complete the negotiation automatically.

At 730, once the link settings are negotiated, configuration settings associated with the port may be set by the switching hardware 403 or by the processor 406. The configuration settings may be adjusted or set for the port based on the negotiated speed, width, and planarization type.

This process may be repeated for each link request. Because a switch 106 may connect to any number of devices 103 via a single port 206, when a cable 209 is connected to the switch 106, the process described above may be performed for any link request received.

As each link request received from a given port is negotiated, the configuration settings for the port may be updated. For example, four devices 103 may connect to a single port 206 using a four-to-one cable 209. The switch 106 may negotiate with each device 103 separately and as each negotiation, as described above in relation to FIG. 7, is completed, the switch 106 may configure settings associated with the port in response.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

It should be appreciated that inventive concepts cover any embodiment in combination with any one or more other embodiment, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

Example embodiments may be configured according to any one or more of the following:

(1) A system for automatically configuring port settings, the system comprising one or more circuits to: receive a first link request; determine, based on the first link request, whether a source of the first link request supports planarization or does not support planarization; and in response to determining whether the source of the first link request supports or does not support planarization, establish a link with the source of the first link request.

(2) The system of (1), wherein the first link request was received via a port.

(3) The system of (1) or (2), wherein the source of the first link request is determined to support planarization, wherein establishing the link comprises initializing a planarized communication session.

(4) The system of any more of (1) to (3), wherein the source of the first link request is determined to not support planarization, wherein prior to establishing the link, the one or more circuits: in response to determining the source does not support planarization, generate a non-planarized link request; and send the non-planarized link request to the source.

(5) The system of any more of (1) to (4), wherein determining the source does not support planarization is based on a determination that the first link request does not indicate a planarization type.

(6) The system of any more of (1) to (5), wherein establishing the link comprises reconfiguring a port in response to determining the source does not support planarization.

(7) The system of any more of (1) to (6), wherein determining whether the source of the first link request supports or does not support planarization is performed in a physical layer, and establishing the link comprises sending an event to an operating system.

(8) The system of any more of (1) to (7), wherein the first link request comprises an auto-negotiation advertisement message comprising an auto-negotiation link partner ability register, and wherein the auto-negotiation link partner ability register comprises a planarization type field.

(9) The system of any more of (1) to (8), wherein the first link request comprises one or more fields, each field indicating one of a number of lanes, a speed, and a planarization type.

(10) The system of any more of (1) to (9), wherein the one or more circuits are further to: receive, via a port, a second link request from a second source; determine whether the second source supports or does not support planarization; and configure one or more settings associated with the port in response to determining whether the second source supports or does not support planarization.

(11) The system of any more of (1) to (10), wherein the one or more circuits are further to: receive, via a port, a second link request; determine, based on the second link request, whether a source of the second link request supports planarization or does not support planarization; and configure one or more settings associated with the port in response to determining whether the source of the second link request supports or does not support planarization.

(12) The system of any more of (1) to (11), wherein the one or more circuits are further to: receive a second link request from a second source; receive a third link request from a third source; receive a fourth link request from a fourth source; determine whether each of the second, third, and fourth sources support or do not support planarization; and configure one or more settings associated with a port in response to determining whether each of the second, third, and fourth sources support or do not support planarization.

(13) The system of any more of (1) to (12), wherein the link request is received via a port comprising at least two lanes.

(14) The system of any more of (1) to (13), wherein the one or more circuits are further to transmit a second link request toward the source of the first link request.

(15) The system of any more of (1) to (14), wherein the one or more circuits are further to determine one or more of a speed capability and a number of lanes common to both a destination and the source.

(16) The system of any more of (1) to (15), wherein establishing the link comprises selecting a number of lanes and a speed.

(17) The system of any more of (1) to (16), wherein the one or more circuits are further to, prior to establishing the link, determine communication requirements indicated in the first link request do not match communication requirements of the system, and in response, generate a notification.

(18) The system of any more of (1) to (17), wherein the link request is received via one of an InfiniBand port and an Ethernet port.

(19) A method comprising: receiving, by one or more circuits, via a port, a link request; determining by the one or more circuits, based on the link request, whether a source of the link request supports planarization or does not support planarization; and in response to determining whether the source of the link request supports or does not support planarization, establishing, by the one or more circuits, a link with the source of the link request.

(20) A planarized switch comprising one or more circuits to: receive a link request; determine, based on the link request, whether a source of the link request supports planarization or does not support planarization; and in response to determining whether the source of the link request supports or does not support planarization, establish a link with the source of the link request.

What is claimed is:

1. A system for automatically configuring port settings for a link, the system comprising one or more circuits to:
  prior to establishing the link, receive a first link request, wherein the first link request comprises one or more fields indicating a number of lanes, a speed, and a planarization type;
  in response to the first link request, and prior to establishing the link, determine, based on the first link request, whether a source of the first link request supports planarization or does not support planarization; and
  in response to determining whether the source of the first link request supports or does not support planarization, establish the link with the source of the first link request, wherein establishing the link with the source of the first link request comprises automatically setting the planarization type for the first link based on the first link request.

2. The system of claim 1, wherein the first link request was received via a port.

3. The system of claim 1, wherein the source of the first link request is determined to support planarization, wherein establishing the link comprises initializing a planarized communication session.

4. The system of claim 1, wherein the source of the first link request is determined to not support planarization, wherein prior to establishing the link, the one or more circuits:
  in response to determining the source does not support planarization, generate a non-planarized link request; and
  send the non-planarized link request to the source.

5. The system of claim 1, wherein determining the source does not support planarization is based on a determination that the first link request does not indicate the planarization type.

6. The system of claim 1, wherein establishing the link comprises reconfiguring a port in response to determining the source does not support planarization.

7. The system of claim 1, wherein determining whether the source of the first link request supports or does not support planarization is performed in a physical layer, and establishing the link comprises sending an event to an operating system.

8. The system of claim 1, wherein the first link request comprises an auto-negotiation advertisement message comprising an auto-negotiation link partner ability register, and wherein the auto-negotiation link partner ability register comprises a planarization type field.

9. The system of claim 1, wherein the one or more circuits are further to:
  receive, via a port, a second link request from a second source;
  determine whether the second source supports or does not support planarization; and
  configure one or more settings associated with the port in response to determining whether the second source supports or does not support planarization.

10. The system of claim 1, wherein the one or more circuits are further to:
  receive, via a port, a second link request;
  determine, based on the second link request, whether a source of the second link request supports planarization or does not support planarization; and
  configure one or more settings associated with the port in response to determining whether the source of the second link request supports or does not support planarization.

11. The system of claim 1, wherein the one or more circuits are further to:
  receive a second link request from a second source;
  receive a third link request from a third source;
  receive a fourth link request from a fourth source;
  determine whether each of the second, third, and fourth sources support or do not support planarization; and
  configure one or more settings associated with a port in response to determining whether each of the second, third, and fourth sources support or do not support planarization.

12. The system of claim 1, wherein the link request is received via a port comprising at least two lanes.

13. The system of claim 1, wherein the one or more circuits are further to transmit a second link request toward the source of the first link request.

14. The system of claim 1, wherein the one or more circuits are further to determine a number of lanes common to both a destination and the source.

15. The system of claim 1, wherein establishing the link comprises selecting the number of lanes and the speed.

16. The system of claim 1, wherein the one or more circuits are further to, prior to establishing the link, determine communication requirements indicated in the first link request do not match communication requirements of the system, and in response, generate a notification.

17. The system of claim 1, wherein the link request is received via one of an InfiniBand port and an Ethernet port.

18. A method for automatically configuring port settings for a link, the method comprising:
  prior to establishing the link, receiving, by one or more circuits, via a port, a link request, wherein the link request comprises one or more fields indicating a number of lanes, a speed, and a planarization type;
  in response to the link request, and prior to establishing the link, determining by the one or more circuits, based on the link request, whether a source of the link request supports planarization or does not support planarization; and in response to determining whether the source of the link request supports or does not support planarization, establishing, by the one or more circuits, the link with the source of the link request, wherein establishing the link with the source of the link request comprises automatically setting the planarization type for the link based on the link request.

19. A planarized switch comprising one or more circuits to:

prior to establishing a link, receive a link request, wherein the first link request comprises one or more fields indicating a number of lanes, a speed, and a planarization type;

in response to the link request, and prior to establishing the link, determine, based on the link request, whether a source of the link request supports planarization or does not support planarization; and in response to determining whether the source of the link request supports or does not support planarization, establish the link with the source of the link request, wherein establishing the link with the source of the link request comprises automatically setting the planarization type for the link based on the first-link request.

20. The system of claim 1, wherein the system is a switch, and wherein the link is a link between the switch and a device connected to the switch by a cable.

\* \* \* \* \*